(12) United States Patent
Nakamura

(10) Patent No.: US 6,628,353 B2
(45) Date of Patent: *Sep. 30, 2003

(54) FLAT DISPLAY DEVICE HAVING A DISPLAY PANEL INCLUDING A PLURALITY PIXELS AND A MICROLENS SUBSTRATE INCLUDING A PLURALITY OF MICROLENS

(75) Inventor: Hiroki Nakamura, Ageo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,250

(22) Filed: Nov. 10, 1999

(65) Prior Publication Data

US 2002/0130990 A1 Sep. 19, 2002

(30) Foreign Application Priority Data

Nov. 10, 1998 (JP) ............................................. 10-318986
Oct. 18, 1999 (JP) ............................................. 11-295623

(51) Int. Cl.⁷ ...................... G02F 1/1335; G02F 1/1333; G02F 1/1339
(52) U.S. Cl. .......................... 349/95; 349/122; 349/137; 349/153
(58) Field of Search .......................... 349/95, 153, 122, 349/137; 345/32

(56) References Cited

U.S. PATENT DOCUMENTS

| | | | | |
|---|---|---|---|---|
| 5,105,290 A | * | 4/1992 | Tomi et al. | 359/80 |
| 5,499,127 A | * | 3/1996 | Tsubota et al. | 359/80 |
| 5,508,834 A | * | 4/1996 | Yamada et al. | 359/83 |
| 5,541,776 A | * | 7/1996 | Kobayashi et al. | 359/665 |
| 5,555,476 A | * | 9/1996 | Suzuki et al. | 359/40 |
| 5,745,199 A | * | 4/1998 | Suzuki et al. | 349/95 |
| 5,760,849 A | * | 6/1998 | Omae et al. | 349/5 |
| 5,808,712 A | * | 9/1998 | Hishida et al. | 349/95 |
| 5,844,644 A | * | 12/1998 | Oh et al. | 349/95 |
| 6,002,459 A | * | 12/1999 | Kaise et al. | 349/95 |
| 6,031,591 A | * | 2/2000 | Hamanaka | 349/95 |
| 6,137,555 A | * | 10/2000 | Tamura et al. | 349/95 |

FOREIGN PATENT DOCUMENTS

| | | | |
|---|---|---|---|
| JP | 61-260223 A | * | 11/1986 |
| JP | 3-269519 | * | 12/1991 |
| JP | 4-240615 | | 8/1992 |
| JP | 40-240616 A | * | 8/1992 |
| JP | 9-258195 | | 10/1997 |

* cited by examiner

Primary Examiner—Tarifur R. Chowdhury
(74) Attorney, Agent, or Firm—Pillsbury Winthrop LLP

(57) ABSTRACT

A microlens substrate and a liquid crystal panel are attached with a liquid layer having a lower refractive index than that of a microlens interposed between them. This suppresses light amount loss caused by interface reflection. The liquid layer also prevents mixing of moisture or dust, which occurs when an air layer is interposed, and thereby improves the reliability of the device.

8 Claims, 6 Drawing Sheets

FLAT DISPLAY DEVICE HAVING A DISPLAY PANEL INCLUDING A PLURALITY PIXELS AND A MICROLENS SUBSTRATE INCLUDING A PLURALITY OF MICROLENS

BACKGROUND OF THE INVENTION

The present invention relates to a flat display device and, more particularly, to a flat display device including a condenser substrate on which condenser means such as microlenses are formed in one-to-one correspondence with pixels of a display panel.

Recently, flat display devices having high density and large capacity and yet capable of obtaining high display quality are beginning to be put into practical use. In these flat display devices, active matrix type liquid crystal displays using thin film transistors (to be referred to as TFTs hereinafter) as elements for driving pixels are often used, since no cross talk exists between adjacent pixel electrodes, high contrast display can be obtained, and a large screen is readily formable because transmission type display is possible.

Driving elements of such liquid crystal displays are a TFT using amorphous silicon (to be referred to as a-Si hereinafter), i.e., an a-SiTFT and a TFT using polysilicon (to be referred to as p-Si hereinafter), i.e., a p-SiTFT. These driving elements are already commercially available.

A p-SiTFT has higher electron mobility than that of an a-SiTFT, can decrease the size of a driving element, and can improve the pixel aperture ratio on a pixel electrode. Additionally, a p-SiTFT allows circuits for driving scanning lines and signal lines to be integrally formed on an active matrix substrate. This obviates the work of externally attaching driving ICs and the like to a liquid crystal display panel. Since this simplifies the packaging process, the cost can be reduced.

Large screen display can be realized by forming a high-resolution active matrix liquid crystal display by using such p-TFTs and projecting images in enlarged scale by using a projecting lens. Therefore, a front data projector which projects images from the front side of a screen and a rear projection TV which projects images from the back side of a screen are developed.

In such projection type liquid crystal displays, miniaturization of liquid crystal panels is being desired in order to reduce the dimensions, weight, and cost of projector mechanisms. Meanwhile, to increase the brightness of a screen it is being attempted to increase the aperture ratio of a liquid crystal display and improve the efficiency of an optical system by using a high-luminance, high-power light source.

If the resolution is increased while the dimensions of a liquid crystal panel are kept small, the aperture ratio decreases. Hence, it is being attempted to effectively increase the pixel aperture ratio by condensing incident light to a pixel opening by using a microlens substrate.

Unfortunately, the above liquid crystal display has the following problem. That is, an ion exchange substrate is used as a micro lens substrate, and ion exchange microlenses require a soda glass substrate. A soda glass substrate has a thermal expansion coefficient twice or more that of glass generally used in a liquid crystal panel. Therefore, when light irradiates the panel with illuminance increased as the resolution of a liquid crystal display increases, thermal expansion shifts the positions of a pixel opening in the liquid crystal display and a microlens of a microlens substrate from each other. To eliminate this problem, various substrates in which convex lenses are formed on the surface of a glass substrate are being developed as microlens substrates.

FIG. 9 shows the structure of a flat display device, relevant to the present invention, which uses an ion exchange microlens substrate 51 as described above. An array substrate 11 on which TFTs 12 are formed as switching elements and a counter substrate 15 are opposed to each other and attached by a sealing member 13 with a liquid crystal composition 14 being sandwiched between them, thereby constructing a liquid crystal panel 10. The microlens substrate 51 is mounted on the surface of this liquid crystal panel 10. In this microlens substrate 51, microlenses 52 which are high-refractive-index regions are formed in one surface of a glass substrate. Since the surface of this microlens substrate 51 is flat, the microlens substrate 51 is adhered to the counter substrate 15 of the liquid crystal panel 10 by using an ultraviolet-curing adhesive 53.

In the case of ion exchange microlenses, an adhesive having the same refractive index as that of glass can be used as the ultraviolet-curing adhesive 53, so the degree of freedom of choosing an adhesive is large. However, the ion exchange microlenses have problems such as a large thermal expansion coefficient as described above and hence cannot meet the demands on high resolution in the future. Additionally, such microlenses cannot be peeled because they are adhered to a liquid crystal panel over the entire surface. Accordingly, even if the microlens substrate 51 is damaged after the adhesion, so-called rework is impossible by which the microlens substrate 51 is peeled from the liquid crystal panel 10 to reuse the expensive liquid crystal panel 10.

As microlenses capable of meeting the demands on high resolution of liquid crystal panels, a method is beginning to be employed by which convex lenses are formed by using a resin on a glass substrate or by dry-etching a glass substrate. FIG. 10 shows the structure of this liquid crystal display. A microlens substrate 31 is manufactured by forming convex lenses 32 on the surface of a glass substrate. This microlens substrate 31 is so placed that these convex lenses 32 oppose the surface of a liquid crystal panel 10, and is adhered to the liquid crystal panel 10 with a low-refractive-index adhesive 32 being interposed between them. Alternatively, the liquid crystal panel and the microlens substrate are adhered by an adhesive with an air layer being interposed between them.

When, however, the counter substrate and the microlens substrate are adhered over the entire surfaces by the low-refractive-index adhesive as in the former case, the low-refractive-index adhesive is expensive, and the adhered members readily peel. When these members are adhered via an air layer as in the latter case, reflection occurs in two interfaces owing to the existence of the air layer, and this causes light amount loss each time reflection occurs. Furthermore, moisture easily enters between the substrates to cause clouding.

As described above, liquid crystal displays relevant to the present invention have the problems that light amount loss occurs between a microlens substrate and a display panel and the cost is high.

SUMMARY OF THE INVENTION

It is, therefore, an object of the present invention to provide a flat display device capable of suppressing light amount loss between a condenser substrate and a display panel and reducing the cost.

According to the present invention, there is provided a flat display device comprising a flat display panel having a plurality of pixels, and a condenser substrate having a plurality of condenser means formed in one-to-one correspondence with the pixels of the display panel, wherein the display panel and the condenser substrate are attached via a liquid layer.

As described above, the condenser substrate and the liquid crystal panel are attached via the liquid layer having a lower reflective index than that of the condenser means. This suppresses light amount loss caused by interface reflection. Also, the liquid layer prevents mixing of moisture or dust, which occurs when an air layer is interposed, and thereby improves the reliability of the device. When the condenser substrate is adhered to the display panel over the entire surface by using an adhesive, the degree of freedom of selecting an optimum refractive index is low. However, in the present invention, the condenser characteristics can be optimized with relative ease by controlling the refractive index of the liquid layer. Furthermore, when surface adhesion is performed, distortions are produced by volume shrinkage during ultraviolet curing, the adhesive generates birefringence, the microlens characteristics are adversely affected, and local peeling occurs in a peripheral portion when a reliability test is conducted. The present invention can also prevent these inconveniences.

The display panel and the condenser substrate may be attached via a sealing member formed in a peripheral portion of a display region in the display panel and the liquid layer injected inside the sealing member and having a refractive index lower than that of the condenser means.

A gap control member for controlling a gap between the display panel and the condenser substrate may be mixed in the sealing member.

The liquid layer may contain at least one of ethylene glycol and glycerin.

The liquid layer may contain perfluoropolyether.

The liquid layer may contain fluorosilicone oil.

The condenser means may be made of an organic material.

At least one of a protective film and an antireflection film is desirably formed on at least one of a surface of the condenser means of the condenser substrate and a surface of the condenser substrate, which is opposite to a surface facing the display panel.

The condenser substrate may be a microlens substrate or a holographic color filter.

A flat display device of the present invention is a display device comprising a display panel having a plurality of pixels and a condenser substrate having a plurality of condenser means formed in one-to-one correspondence with the pixels of the display panel, wherein a first peripheral region having height different from an apex height of the condenser means is formed outside a region of the condenser substrate in which the condenser means are formed, and a second peripheral region having substantially the same height as the apex height of the condenser means is formed outside the first peripheral region.

As described above, a portion to be adhered to a microlens substrate and a counter substrate of a display panel has substantially the same height as a lens portion. This improves the uniformity of the distance between the microlens substrate and the counter substrate, reduces variations in the transmittance characteristics, and prevents degradation of the display quality such as display irregularity.

Although the second peripheral region and the condenser means are desirably made of the same material, they can also be formed in different steps by using the same material or different materials.

The condenser substrate can be adhered to the liquid crystal panel in a region including the second peripheral region. By fixing the condenser substrate and the liquid crystal panel in the second peripheral region having substantially the same height as the condenser means, the distance between the condenser means and the liquid crystal panel can be made uniform.

An alignment mark used to align the display panel and the condenser substrate may be formed in the first peripheral region.

A liquid layer may be interposed in at least a display region between the display panel and the condenser substrate.

To facilitate injecting the liquid layer into at least the display region between the display panel and the condenser substrate, a portion of the first peripheral region may be extended to an end of the condenser substrate.

A flat display device of the present invention comprises a flat display panel having a plurality of pixels and a condenser substrate having a plurality of condenser means formed in one-to-one correspondence with the pixels of the display panel, wherein the display panel and the condenser substrate are attached by an ultraviolet-curing resin with a liquid layer being interposed between them.

A peripheral portion of the condenser substrate may be sealed with a sealing agent.

The sealing agent can fix the flat display device and a holding member for holding the flat display device.

The liquid layer may contain at least one of ethylene glycol and glycerin.

The liquid layer can contain perfluoropolyether.

The liquid layer may contain fluorosilicone oil.

The condenser means may be made of an organic material.

A protective layer made of an inorganic or organic material is desirably formed on a surface of the condenser means, which is in contact with the liquid layer.

An antireflection film may be formed on a surface of the condenser substrate, which is opposite to a surface facing the display panel.

The condenser substrate may be a microlens substrate or a holographic color filter.

DESCRIPTION OF THE PREFERRED EMBODIMENTS

An embodiment of the present invention will be described below with reference to the accompanying drawings.

Figure 1:
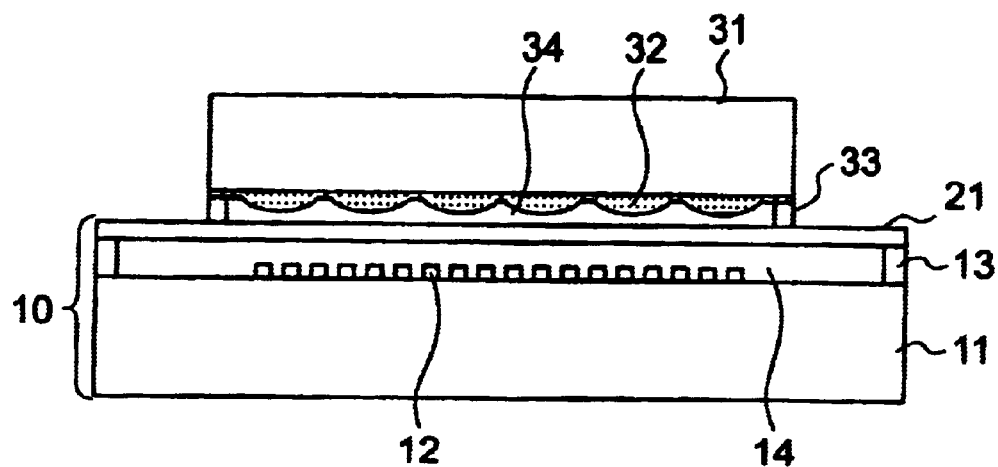
FIG. 1 is a longitudinal sectional view showing the sectional structure of a liquid crystal display according to the first embodiment of the present invention.
Figure 2:
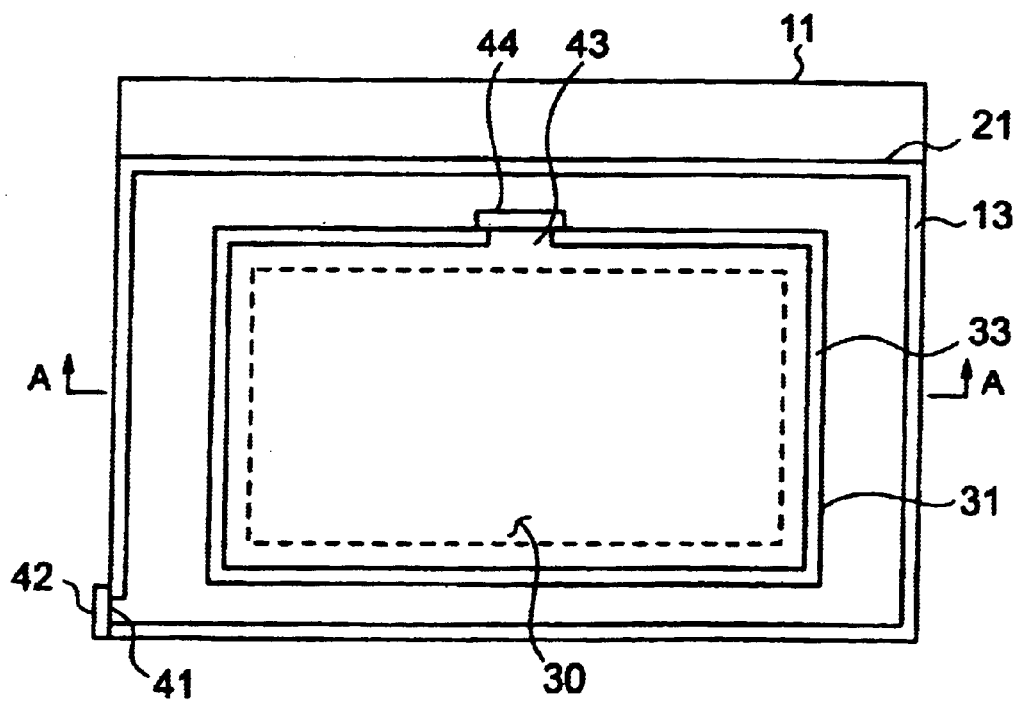
FIG. 2 is a plan view showing the plane structure of the liquid crystal display.

A flat display device according to the first embodiment of the present invention has a sectional structure as shown in FIG. 1 and a plane structure as shown in FIG. 2. FIG. 1 is a longitudinal sectional view taken along a line A—A in FIG. 2.

A liquid crystal panel 10 has an array substrate 11, a counter substrate 21, and a liquid crystal composition 14. TFTs 12 are formed on the array substrate 11. The counter substrate 21 is opposed and adhered to the array substrate 11 by a sealing member 13. The liquid crystal composition 14 is injected between the array substrate 11 and the counter substrate 21 from an injection port 41 and sandwiched between them while being sealed by a sealing agent 42.

A microlens substrate 31 as a condenser substrate is mounted on the surface of the counter substrate 21 of this liquid crystal panel 10. On the surface of this microlens substrate 31, microlenses 32 are formed as condenser means in one-to-one correspondence with pixels of the liquid crystal panel 10. These microlenses 32 can be formed inexpensively by molding, e.g., an epoxy-based or acryl-based ultraviolet-curing resin on a glass substrate.

The liquid crystal panel 10 and the microlens substrate 31 are attached as follows. The surface of the counter substrate 21 or of the microlens substrate 31 is coated with an ultraviolet-curing sealing member 33 so as to surround an image display region 30 of the liquid crystal panel 10, and the two substrates are adhered. After the microlens substrate 31 and the liquid crystal panel 10 are aligned, ultraviolet rays irradiate to cure the sealing member 13, thereby adhering and fixing the microlens substrate 31 and the liquid crystal panel 10.

When the microlens substrate 31 and the liquid crystal panel 10 are thus fixed, a liquid layer 34 having a lower refractive index than that of the microlens 32 is interposed between them. When the microlens 32 is formed of an epoxy-based resin having a refractive index of 1.59 or an acryl-based resin having a refractive index of 1.54, it is necessary to use the liquid layer 34 having a refractive index lower than these refractive indices. For example, ethylene glycol, glycerin, or an aqueous solution of ethylene glycol or glycerin can be used as the liquid layer 34. The refractive index of a 50% aqueous solution using ethylene glycol or glycerin is approximately 1.38. Perfluoropolyether (refractive index 1.3) or fluorosilicone oil (refractive index 1.38) can also be used.

To accurately control the spacing between the microlens substrate 31 and the counter substrate 21, a gap control member made of, e.g., glass fibers and having a thickness of 3 to 30 $\mu$m is mixed in the sealing member 33. After the microlens substrate 31 is fixed on the counter substrate 11, a desired gap can be obtained by injecting the liquid layer 34, in a vacuum or under pressure, from an injection port 43. After that, the injection port 43 is sealed with a sealing agent 44. However, the gap control member need not be used if the sealing portion can be uniformly processed. In the case of injection under pressure, it is, of course, possible to inject and seal the material with a discharge port formed in addition to the injection port.

In the process of mounting the microlens substrate 31 on the counter substrate 21, the surface of the microlens 32 opposed to the counter substrate 21 is readily damaged. For example, in a cleaning step or substrate transfer step, dust particles and the like produced from the end face of the glass substrate may stick to and damage the surface of the microlens 32.

To protect this lens surface, it is possible to ensure the gap between the microlens substrate 31 and the counter substrate 21 by using the sealing member 33 containing the gap control member as described above, so the lens surface does not directly contact the counter substrate 21. It is further desirable to form a siloxane-based film or a fluorine-based resin film on the lens surface.

An example of a siloxane-based film is N-103X available from COLCOAT Co. A siloxane-based film has an antistatic effect and wear resistance and hence does not allow easy adhesion of dust particles and suppresses damages to the lens surface. When a siloxane-based film is formed not only on the lens surface but also on the light incident surface of the microlens substrate 31, which is opposite to the surface facing the counter substrate 21, the interface reflectance of this surface is reduced. Consequently, the effective light transmittance can be increased.

As a fluorine-based resin film, it is possible to use, e.g., Cytop available from Asahi Glass Co., Ltd. or an Opstar-based resin film available from JSR Co. These fluorine-based resin films have not only wear resistance but also a low refractive index of about 1.38. Therefore, when this fluorine-based resin film is formed on the light incident surface of the microlens substrate 31, an effect of reducing the interface reflectance can be obtained. Also, when a fluorine-based resin film is to be used, to increase the film strength, it is desirable to apply the resin after it is treated by a coupling agent and dry the resin at 150° C. for 30 min.

In the first embodiment as described above, the low-refractive-index layer 34 exists between the microlens substrate 31 and the liquid crystal panel 10. This reduces light amount loss caused by interface reflection between the microlens 32 and the counter substrate 21. When a microlens substrate and a counter substrate are adhered over the entire surfaces by applying an adhesive between them as in conventional display devices, no rework is possible once these two substrates are adhered.

In the first embodiment, however, the counter substrate 21 and the microlens substrate 31 are attached not over the entire surfaces but by the peripheral sealing member 33 with the liquid layer 34 interposed between them. This allows the counter substrate 21 and the microlens substrate 31 to be peeled from each other by irradiating the sealing member 33 with ultraviolet rays. Accordingly, even when the alignment accuracy of the two substrates is unsatisfactory or a failure occurs owing to dust particles or the like, rework is possible by which the expensive microlens substrate 31 or liquid crystal panel 10 is reused. This reduces the cost and improves the yield.

A flat display device according to the second embodiment of the present invention will be described below with reference to FIG. 3.

As in the first embodiment, a liquid crystal panel 10 has an array substrate 11, a counter substrate 21, and a liquid crystal composition 14. TFTs 12 are formed on the array substrate 11. The counter substrate 21 is opposed and adhered to the array substrate 11 by a sealing member 13. The liquid crystal composition 14 is sandwiched between the array substrate 11 and the counter substrate 21.

A microlens substrate 61 is mounted as a condenser substrate on the surface of the counter substrate 21 of this liquid crystal panel 10. On the surface of this microlens substrate 61, microlenses 62 are formed in one-to-one correspondence with pixels of the liquid crystal panel 10. One microlens can be formed for one pixel or for three pixels of R, G, and B. In the structure shown in the sectional view of FIG. 3, one microlens is formed for three pixels. These microlenses 62 can be formed inexpensively by, e.g., molding an epoxy-based or acryl-based ultraviolet-curing resin on a glass substrate.

Figure 4A:
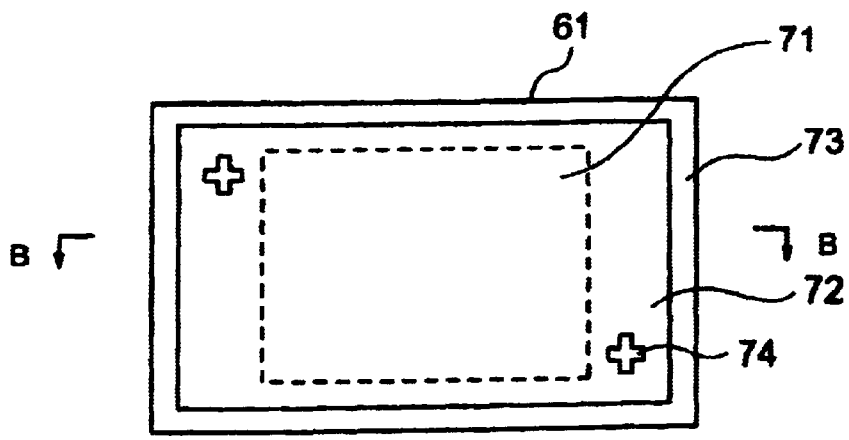
FIGS. 4A and 4B are a plan view and a longitudinal sectional view showing the top surface and the longitudinal section, respectively, of a microlens substrate of the liquid crystal display.
Figure 4B:
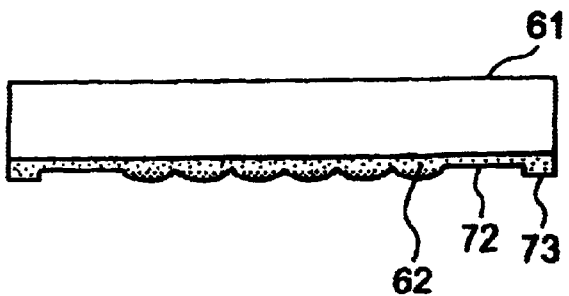

FIG. 4A shows the plane structure of the microlens substrate 61. FIG. 4B shows the longitudinal section of the microlens substrate 61 taken along a line B—B in FIG. 4A. This microlens substrate 61 has a microlens region 71 including the microlenses 62, a first peripheral region 72 formed outside the microlens region 71, and a second peripheral region 73 formed outside the first peripheral region 72.

The second peripheral region 73 is formed like a peripheral frame having substantially the same height as the apex of the microlens 62 in the microlens region 71. The first peripheral region 72 is lower than the apex of the microlens 62 and the second peripheral region 73 and is formed like a frame between the microlens region 71 and the second peripheral region 73. Alignment marks 74 used to align the liquid crystal panel 10 and the microlens substrate 61 are formed in portions of the first peripheral region 72.

In this embodiment, the second peripheral region 73 is formed over the entire outermost periphery of the microlens substrate 61. However, this second peripheral region 73 can also be formed only around an adhesive-fixing region.

Figure 3:
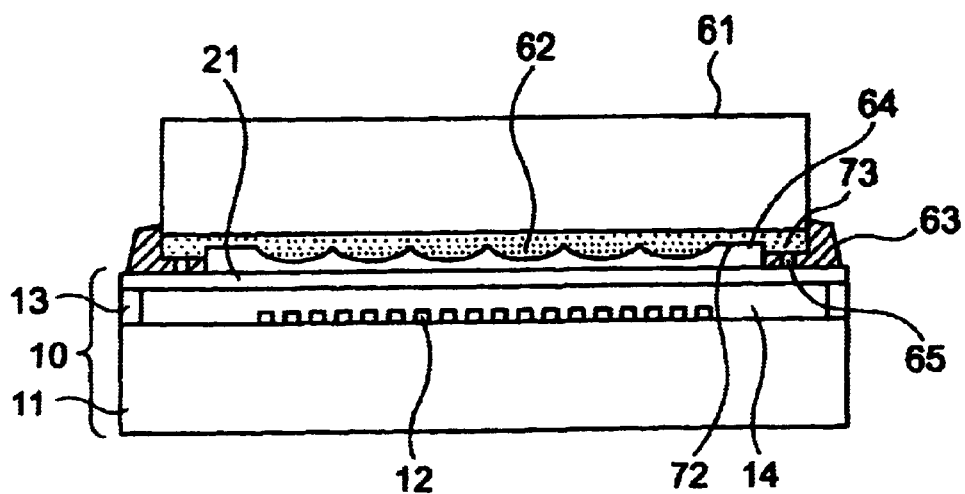
FIG. 3 is a longitudinal sectional view showing the sectional structure of a liquid crystal display according to the second embodiment of the present invention.

As shown in FIG. 3, the microlens substrate 61 with the above construction is so fixed that a display region of the liquid crystal panel 10 opposes the microlenses 62. For example, the surface of the microlens substrate 61 or of the counter substrate 21 of the liquid crystal panel 10 is coated with an ultraviolet-curing sealing material 65. After the microlens substrate 61 and the liquid crystal panel 10 are aligned, ultraviolet rays irradiate to cure the sealing material 65, thereby adhering and fixing the microlens substrate 61 and the counter substrate 21.

When the microlens substrate 61 and the counter substrate 21 are attached, a liquid layer 64 is interposed between them. This liquid layer 64 has a refractive index lower than the refractive index (about 1.59 when an epoxy-based resin is used and about 1.54 when an acryl-based resin is used) of the microlens 62. An example is perfluoropolyether (FOMBLIN (trademark) available from Ausimont Co.; refractive index of 1.30).

To accurately control the spacing between the microlens 61 and the counter substrate 21, a gap material made of, e.g., glass fibers and having a length of 3 to 30 μm may be mixed in the sealing material 65.

Figure 5:
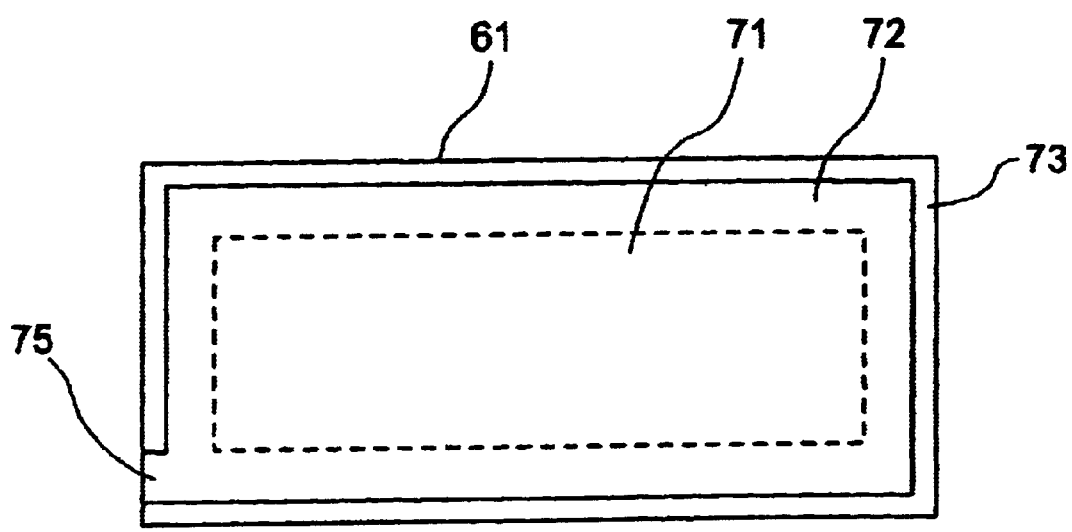
FIG. 5 is a plan view showing an arrangement in which an injection port for injecting a liquid crystal is formed in the microlens substrate of the liquid crystal display.

Additionally, as depicted in FIG. 5 which shows the plane structure of the microlens substrate 61, an injection port 75 can be formed in at least one portion of the second peripheral region 73. If this is the case, after the microlens substrate 61 is fixed to the liquid crystal panel 10, the liquid layer 64 to be interposed between them is injected in a vacuum or under pressure. In this manner, the spacing between the two substrates can be accurately controlled. To facilitate the liquid injection, the second peripheral region 73 is not formed in the entire peripheral of the microlens substrate 61 but, as shown in FIG. 5, is leveled with the first peripheral region 72, which is lower than the second peripheral region 73, in at least a portion around the injection port, thereby making the surface of the second peripheral region 73 continuous with that of the first peripheral region 72.

In this embodiment, the second peripheral region 73 having substantially the same height as the apex of the microlens 62 is formed as an outermost region. In this region, the microlens substrate 61 having the convex microlenses 62 and the liquid crystal panel 10 are adhered and fixed. Therefore, even when the convex microlenses 62 have large lens height, a uniform distance is easily obtained between the microlenses 62 and the counter substrate 21 of the liquid crystal panel 10.

Also, the liquid layer 64 exists between the microlens substrate 61 and the liquid crystal panel 10. In conventional liquid crystal displays, in a peripheral region bubbles are readily formed in the liquid layer 64 to adversely affect the display quality. In this embodiment, however, a region different in height from the microlens, such as the first peripheral region 72, is formed outside the microlens region. This first peripheral region 72 captures bubbles and prevents them from entering the display region, so the display quality improves.

The second peripheral region 73 and the microlenses 62 are desirably formed in the same step by using the same material. The number of steps is reduced and as a consequence the cost is reduced. However, the second peripheral region 73 and the microlenses 62 can also be formed in different steps.

The third embodiment of the present invention will be described below. This embodiment differs from the above second embodiment in the method of fixing a microlens substrate 61 to a liquid crystal panel 10.

Figure 6:
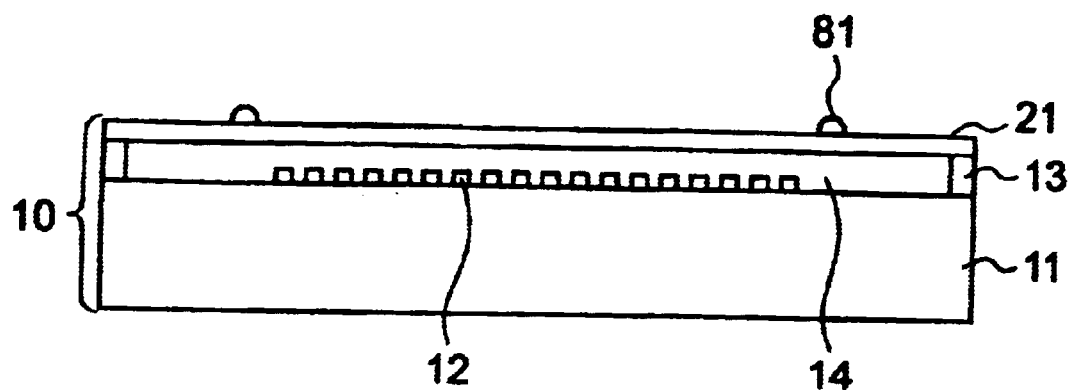
FIG. 6 is a longitudinal sectional view showing the state in which a liquid crystal panel is coated with an ultraviolet-curing resin in a liquid crystal display according to the fourth embodiment of the present invention.
Figure 7:
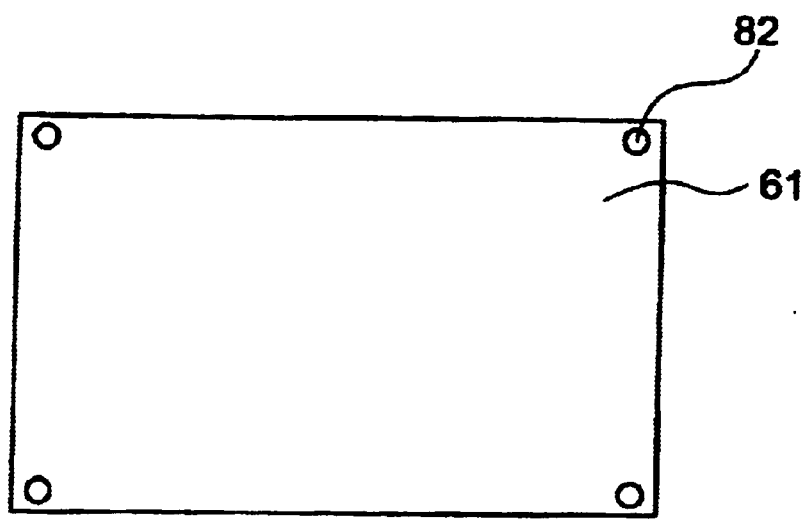
FIG. 7 is a longitudinal sectional view showing the state in which a microlens substrate is coated with an ultraviolet-curing resin in the liquid crystal display.

As shown in FIG. 6, the peripheral portions of a display region on a counter substrate 21 of the liquid crystal panel 10 are coated with an ultraviolet-curing resin 81. Alternatively, as shown in FIG. 7, the peripheral portions, which have no influence on display, of the microlens substrate 61 are coated with an ultraviolet-curing resin 82. The liquid crystal panel 10 and the microlens substrate 61 are aligned and adhered to each other with a low-refractive-index liquid layer being interposed between them. In addition, the ultraviolet-curing resin 81 or 82 is cured and fixed by irradiation with ultraviolet rays.

As in the first embodiment described earlier, the liquid layer interposed between the microlens substrate 61 and the counter substrate 21 of the liquid crystal panel 10 can be perfluoropolyether having a lower refractive index than the refractive index (about 1.59 when an epoxy-based resin is used and about 1.54 when an acryl-based resin is used) of the microlens substrate 61.

The ultraviolet-curing resin can be any resin which is commonly used. However, to make rework of the microlens substrate 61 possible after the microlens 61 is adhered, it is preferable to use an ultraviolet-curing resin which can be peeled with hot water. Examples are a water-soluble temporary adhesive available from ADELL Co. and an ultraviolet-curing silicone gel. Although a silicone gel has tack strength and fixing capability, rework is possible because the adhesion is weak.

In this third embodiment, the ultraviolet-curing resin is dropped onto four portions, i.e., the four corners on the counter substrate 21 of the liquid crystal panel 10 or on the microlens substrate 61 to adhere and fix the two substrates. However, the coating pattern of this ultraviolet-curing resin need not be a dot pattern; any pattern can be used, provided that the substrates can be fixed in portions other than the display region. Examples are a linear pattern and a planar pattern.

In the above first, second, and third embodiments, it should be noted that the convex microlenses 62 of the microlens substrate 61 are easily damaged during the course of opposing the microlenses 62 to the counter substrate 21 of the liquid crystal panel 10 and adhering the two substrates. The causes of these damages are presumably handling steps such as a cleaning step and a substrate transfer step or scrap and dust produced from the end faces of the glass substrate during the process including these steps.

To protect the lens portion from these damages, a siloxane-based film or a fluorine-based resin film, for example, can be formed at least on the surfaces of the convex microlenses 62 of the microlens substrate 61 to protect these surfaces.

For example, when N-103X available from COLCOAT Co. is used as a siloxane-based film, the antistatic effect and the wear resistance of this siloxane-based film do not allow easy adhesion of dust particles and suppress damages to the lens portion.

When a similar protective film is formed not only on the surface of the convex lens portion but also on the light incident surface of a glass substrate 60, which is opposite to the surface on which the microlens substrate 61 is formed, the interface reflectance of this surface is reduced. Consequently, the effective light transmittance can be increased.

Instead of a siloxane-based film, it is also possible to use a fluorine-based resin film such as Cytop available from Asahi Glass Co., Ltd. or an Opstar-based resin film available from JSR CO. When a fluorine-based resin film is to be used, to increase the film strength, it is desirable to apply the resin after it is treated by a coupling agent and dry the resin with heat (at about 150° C. for about 30 min).

The aforementioned embodiments are merely examples and hence do not restrict the present invention. For example, in the first embodiment, the low-refractive-index liquid layer 34 is injected from the injection port 43 after the microlens substrate 31 is attached to the liquid crystal panel 10. However, without forming the injection port 43, it is possible to drop the liquid layer 34 inside the region surrounded by the sealing member 33 on the surface of the liquid crystal panel 10 and then adhere the microlens substrate 31.

Also, in the above first embodiment, the microlenses 32 are formed of a resin. However, microlenses made of convex glass can also be used. A glass microlens has the advantages that the refractive index of glass is as low as n=1.46 or 1.54 and the material does not easily change its properties with moisture or the like. Additionally, the above embodiments are explained by taking a liquid crystal display as an example. However, the present invention is applicable not only to a liquid crystal panel but also to general flat display devices in which a microlens substrate is attached to a flat display panel.

In the above embodiments, after the microlens substrate 31 or 61 is attached and fixed to the liquid crystal panel 10, the low-refractive-index liquid layer 34 or 64 is sealed by surrounding the peripheral portion of the microlens substrate with a sealing agent. When a UV-curing resin is used as the material of the sealing agent, high productivity can be obtained. However, another material such as a moisture-curing resin can also be used.

Furthermore, although the microlenses 62 made of a resin are used in the above embodiments, glass microlenses are also usable. In this structure, a layer having a lower refractive index than that of the microlenses is desirably interposed between the microlens substrate 61 and the counter substrate 21. When glass microlenses are used, however, the refractive index n of glass is 1.46 to 1.54, i.e., lower than that of resin microlenses. Accordingly, the interposition of a low-refractive-index liquid layer, rather than an air layer, between the microlens substrate 61 and the counter substrate 21 is effective in terms of optical characteristics.

Concave microlenses are also usable. If this is the case, it is necessary to use a liquid layer having a refractive index higher than that of the microlens portion.

To increase the refracting power of a convex microlens, it is desirable to perform optical coupling by using a low-refractive-index material. Unfortunately, of currently obtainable ultraviolet-curing adhesives, a fluorine-based acrylic adhesive has the lowest refractive index, but this refractive index is 1.38, and the cost of the adhesive is high. In contrast, perfluoropolyether has a refractive index as lower as 1.30, and has the lens characteristic that it can reduce particularly the spherical aberration.

Additionally, perfluoropolyether has high thermal conductivity and hence can reduce temperature unevenness in a liquid crystal panel. Consequently, contrast irregularity in screen display can be suppressed. Also, this material is a chemically very inert liquid and has very low solubility in water. So, the material helps improve the reliability of the device.

As another liquid material, in place of a fluorine-based acrylic adhesive having a refractive index of 1.38, fluoro-silicone oil having the same refractive index can also be used.

Figure 8:
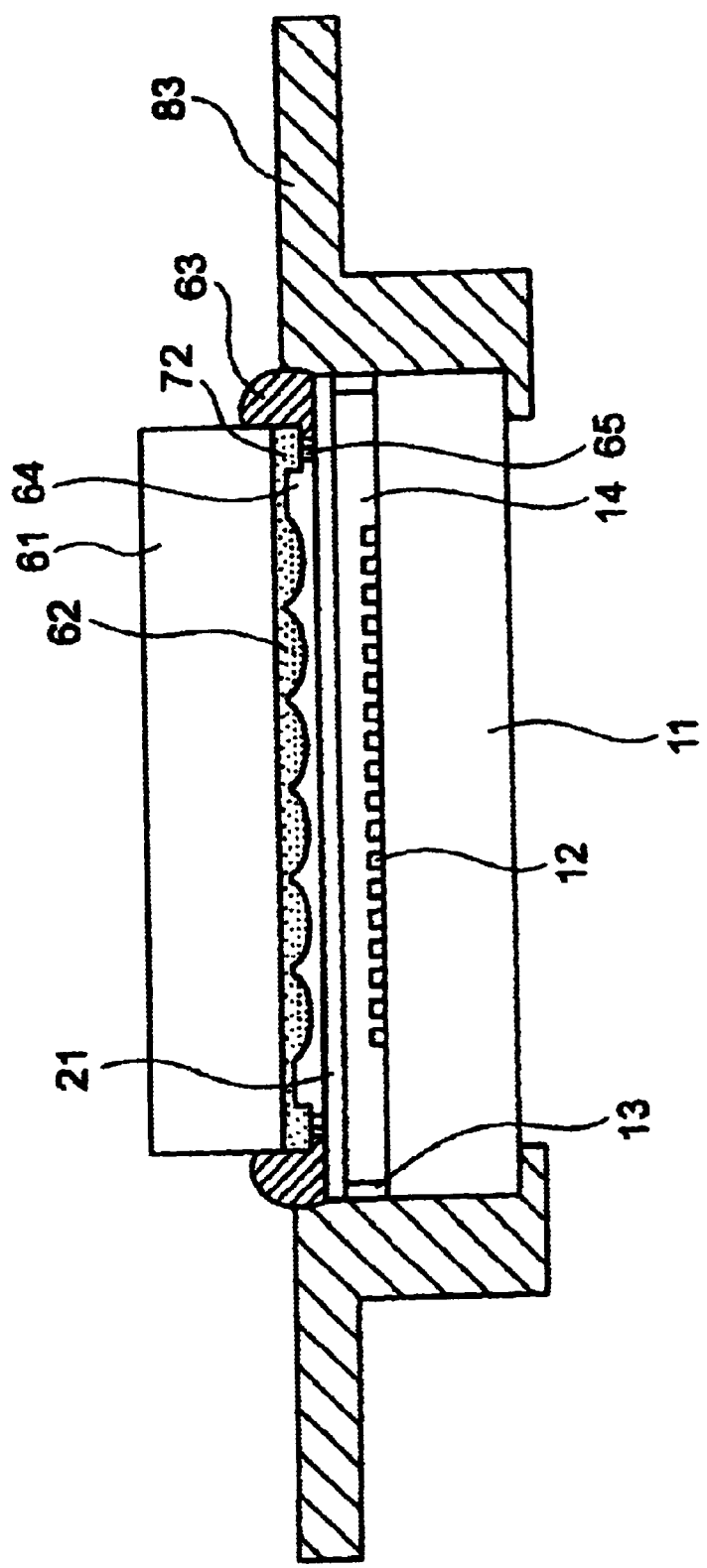
FIG. 8 is a longitudinal sectional view showing a longitudinal section when the liquid crystal display according to any of the second to fourth embodiments is fixed to a frame.
Figure 9:
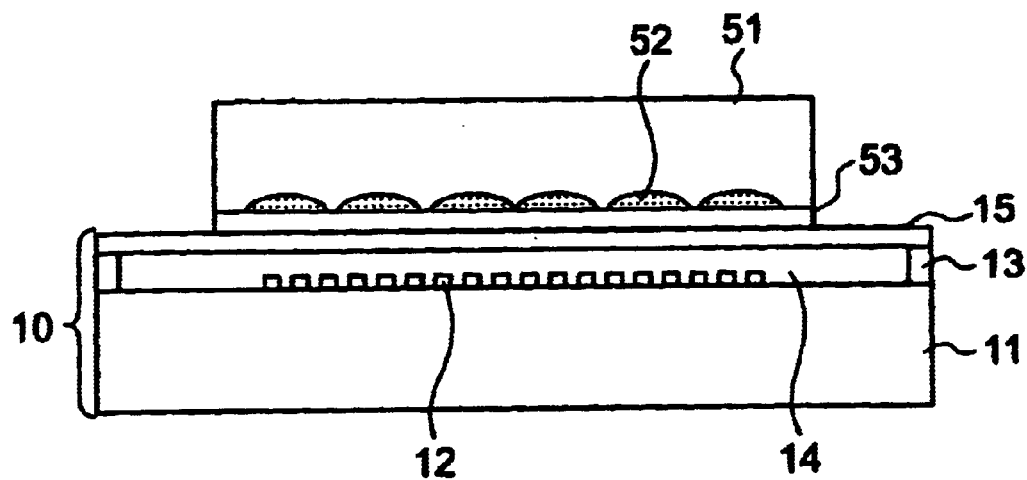
FIG. 9 is a longitudinal sectional view showing the sectional structure of a liquid crystal display relevant to the present invention.
Figure 10:
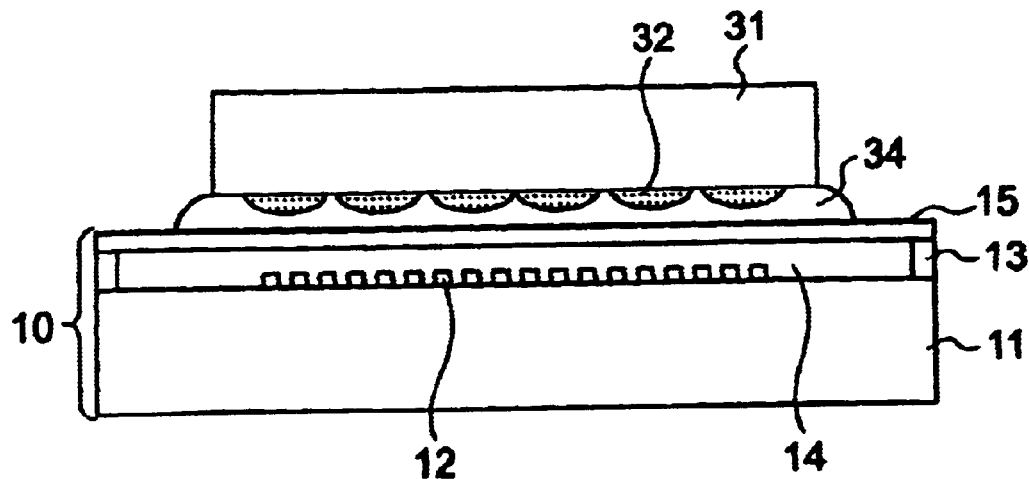
FIG. 10 is a longitudinal sectional view showing the sectional structure of another liquid crystal display relevant to the present invention.

As shown in FIG. 8, a periphery sealing agent 63 of the microlens substrate 61 can be so formed as to also serve as an adhesive-fixing means for a frame 83 which is a holding member for fixing a liquid crystal display.

Furthermore, a condenser substrate is not limited to a microlens substrate but can be a holographic color filter.

In the flat display device of the present invention, a flat display panel and a microlens substrate are attached via a liquid layer having a lower reflective index than that of a microlens. This reduces light amount loss caused by reflection in the interface between these two members. Also, the liquid layer prevents mixing of moisture or dust, which occurs when an air layer is interposed, and thereby improves the reliability of the device.

When a microlens substrate is adhered to a liquid crystal panel over the entire surface by using an adhesive, the degree of freedom of selecting an optimum refractive index is low. However, in the present invention, the condenser characteristics can be optimized relatively easily by controlling the refractive index of the liquid layer.

Moreover, in the present invention a portion to be adhered to a microlens substrate and a counter substrate of a display panel has substantially the same height as a lens portion. This improves the uniformity of the distance between the microlens substrate and the counter substrate, reduces variations in the transmittance characteristics, and prevents degradation of the display quality such as display unevenness.

What is claimed is:

1. A flat display device comprising:

a flat display panel having a liquid crystal layer disposed between two substrates and a plurality of pixels; and a microlens substrate having a plurality of microlens formed in a manner that one microlens is formed for three pixels of said flat display panel, wherein said display panel and said microlens substrate are attached by only an ultraviolet-curing adhesive sealing member formed in a peripheral portion of a display region in said display panel and a liquid layer injected inside said sealing member and having a refractive index lower than that of said microlens, said liquid layer being different than said liquid crystal layer, and a gap control member for controlling a gap between said display panel and said microlens substrate is mixed in said sealing member.

2. A device according to claim 1, wherein said liquid layer contains at least one of ethylene glycol and glycerin.

3. A device according to claim 1, wherein said liquid layer contains perfluoropolyether.

4. A device according to claim 1, wherein said liquid layer contains fluorosilicone oil.

5. A device according to claim 1, wherein said microlens is made of an organic material.

6. A device according to claim 1, wherein at least one of a protective film and an antireflection film is formed on at least one of a surface of said microlens of said microlens substrate and a surface of said microlens substrate, which is opposite to a surface facing said display panel.

7. A device according to claim 1, wherein a peripheral portion of said microlens substrate is sealed with a sealing agent.

8. A device according to claim 7, wherein said sealing agent fixes said flat display device and a holding member for holding said flat display device.

* * * * *